(12) United States Patent
Stepanians

(10) Patent No.: US 7,641,251 B1
(45) Date of Patent: Jan. 5, 2010

(54) COLLAPSIBLE TRUCK RACK AND METHOD OF USE

(76) Inventor: Goorgen Stepanians, 565 Palm Dr., Suite 1, Glendale, CA (US) 91202

( * ) Notice: Subject to any disclaimer, the term of this patent is extended or adjusted under 35 U.S.C. 154(b) by 0 days.

(21) Appl. No.: 12/215,619

(22) Filed: Jun. 27, 2008

Related U.S. Application Data

(60) Provisional application No. 60/937,741, filed on Jun. 29, 2007.

(51) Int. Cl.
*B60P 9/00* (2006.01)

(52) U.S. Cl. .......................................... 296/3; 224/405

(58) Field of Classification Search .................. 296/3; 211/182; 224/405
See application file for complete search history.

(56) References Cited

U.S. PATENT DOCUMENTS

| | | | |
|---|---|---|---|
| 1,886,911 A * | 11/1932 | Schulman | 224/491 |
| 3,594,035 A | 7/1971 | Ferguson | |
| 3,765,713 A | 10/1973 | Suitt | |
| 4,057,281 A | 11/1977 | Garrett | |
| 4,138,046 A | 2/1979 | De Freze | |
| 4,152,020 A | 5/1979 | Brown et al. | |
| 4,211,448 A | 7/1980 | Weston | |
| 4,267,948 A | 5/1981 | Lewis | |
| 4,405,170 A | 9/1983 | Raya | |
| 4,426,011 A * | 1/1984 | Jay | 211/193 |
| 4,659,131 A | 4/1987 | Flournoy, Jr. | |
| 4,770,458 A | 9/1988 | Burke et al. | |
| 5,002,324 A | 3/1991 | Griffin | |
| 5,161,701 A * | 11/1992 | Berny | 211/193 |
| 5,190,337 A | 3/1993 | McDaniel | |
| 5,431,472 A | 7/1995 | Coftland | |
| 5,476,301 A | 12/1995 | Berkich | |
| 5,628,540 A | 5/1997 | James | |
| 5,806,905 A | 9/1998 | Moore | |
| 5,984,121 A * | 11/1999 | Cole | 211/183 |
| D444,446 S | 7/2001 | Carter | |
| 6,347,731 B1 | 2/2002 | Burger | |
| 6,394,524 B1 | 5/2002 | Morse | |
| 6,513,849 B2 | 2/2003 | Carter | |
| 6,557,917 B1 | 5/2003 | Colcombe | |
| 7,258,380 B1 | 8/2007 | Aguilar | |
| 7,296,836 B1 | 11/2007 | Sabo | |
| 7,513,548 B1 * | 4/2009 | Win | 296/3 |
| 2002/0047285 A1 | 4/2002 | Morse | |
| 2006/0163300 A1 | 7/2006 | Kramer | |

FOREIGN PATENT DOCUMENTS

| | | |
|---|---|---|
| CA | 2179259 | 6/1996 |
| WO | WO2007053525 | 10/2007 |

* cited by examiner

*Primary Examiner*—Patricia L Engle
*Assistant Examiner*—Pinel E Romain
(74) *Attorney, Agent, or Firm*—Sandy Lipkin

(57) ABSTRACT

A collapsible truck rack that can be assembled and disassembled easily without the use of tools. The rack can be stored in the interior periphery of the truck bed so as not to appreciable diminish the capacity of the truck bed for the placement therein of items to be transported. The rack does not increase the profile of the vehicle when in the collapsed position and therefore reduces drag during transport. An X-load is added to reduce shift of the load during turns. An optional brace can be bolted to the top surface of the periphery of the truck bad. An optional canvas cover can be used to cover the collapsed rack to secure and protect the rack when not in use.

1 Claim, 8 Drawing Sheets

COLLAPSIBLE TRUCK RACK AND METHOD OF USE

REFERENCE TO PRIOR APPLICATION

This application claims the priority of provisional application 60/937,741, filed Jun. 29, 2007 entitled COLLAPSIBLE TRUCK RACK by Goorgen Stepanians.

BACKGROUND OF THE INVENTION

1. Field of the Invention

The present invention relates generally to the field of racks for trucks, and particularly to a rack that is both easy to assemble and disassemble, requires no tools and that collapses into the internal periphery of the truck in a way that leaves the bed substantially empty for the placement therein of items to be transported.

2. Description of the Prior Art

Racks for trucks have long been known. They are used to provide the ability to transport more than just what will fit into the bed of the truck, particularly items that are larger than the bed as well as extra storage when the bed is filled with other items. Frequently, the racks also extend over the cab of the truck.

One major drawback to most truck racks is that they are bulky and cumbersome. Typical racks maintain their shape whether in use or not and must be bolted down the truck at various points on the truck when in use and unbolted when there is no need for the rack on the truck. When the rack is not needed, if left on the truck, there is a noticeable and significant increase in drag on the truck and a corresponding reduction in gas mileage.

Removal of the rack will remove the unwanted drag, but typically it is very inconvenient to remove the rack. Firstly, the rack needs to be unbolted. Secondly, the rack needs to be stored in a large area because the profile of the rack is so large. One way to overcome the storage issue is to provide a rack that is collapsible into the body of the truck.

By being collapsible, storage of the rack is less of an issue and the rack can be stored in the bed of the truck. Prior art in the field of collapsible truck racks include U.S. Pat. No. 4,659,131 to Flournoy, Jr. This invention provides for a rack that can be broken down into small parts. This rack does not reach over the cab of the truck. Furthermore, this rack requires a great deal of assembly and disassembly that can be quite time-consuming. When not in use, the rack of the Flournoy, Jr. invention is stored atop the periphery of the truck bed and behind the cab. While this provides storage capacity in the truck bed, the wear due to the heightened profile of the vehicle is not maximally improved and therefore the improved gas mileage due to less drag is not optimized.

Another invention is U.S. Pat. No. 7,258,380 to Aguilar. Portions of this rack are removable, but the entire device does not collapse into an easily-transportable unit. When not in use, the front and rear supports of this rack may be removed and placed in the pickup bed or pivoted downward into the pickup bed. The shape and profile of the supports is such that much of the bed is consumed during storage, thereby minimizing the ability to utilize the bed for the transportation of other items when the rack is not in use.

The rack of U.S. Pat. No. 6,347,731 to Burger is another removable rack. This rack does not extend above the cab and is quite complex in its assembly.

Therefore, a need exists for a collapsible truck rack that when collapsed does not increase drag on the vehicle. Furthermore, the rack when collapsed and stored in the vehicle should not significantly consume any of the storage space in the bed.

It is the object of the instant invention to overcome the shortcomings of the prior art.

It is the primary object of the instant invention to provide a collapsible truck rack that does not require the use of tools to assemble and disassemble and that does not consume an appreciable amount of storage space in the truck bed when collapsed into the storage position.

SUMMARY OF THE INVENTION

The preferred embodiment of the present invention teaches a collapsible truck rack comprising a first vertical support; a second vertical support; a third vertical support; a fourth vertical support; wherein the first vertical support, the second vertical support, the third vertical support and the fourth vertical support move between a first vertical position when in use and a second position that is horizontal for placement in the interior peripheral wall of the bed of a truck when not in use; a first horizontal support connecting the first vertical support and the second vertical support; a second horizontal support connecting the second vertical support and the third vertical support; a third horizontal support connecting the third vertical support and the fourth horizontal support; a fourth horizontal support connecting the fourth vertical support and the first vertical support; a substantially rectangular shaped cab extension that extends over the cab of said truck wherein the substantially rectangular shaped cab extension further comprises: a first member connected at one end to the second vertical support; a second member connected at one end to the other end of the first member; a third member connected at one end to the other end of the second member and at the other end to the third vertical support; wherein the second horizontal support is connected between the second vertical support and the third vertical support and acting as the fourth side of the substantially rectangular shaped cab extension; a first angled support with a bendable joint that connects at an angle from the second vertical support to the first member; and a second angled support with a bendable joint that connects at an angle from the third vertical support to the third member; wherein the first vertical support, the second vertical support, the third vertical support and the fourth vertical support are secured to the bed of the truck through corresponding base members that are permanently affixed to the interior peripheral wall of the bed of said truck.

The above embodiment can be further modified by defining that a clamping means such as wingnuts are used to secure the first vertical support, the second vertical support, the third vertical support and the fourth vertical support to the corresponding base members when in use.

The above embodiment can be further modified by defining that the first horizontal support contains a first half and a second half, the second half having a smaller diameter than the first half wherein the second half can be housed in the first half when not in use and can be telescoped back out when in use.

The above embodiment can be further modified by defining that the second horizontal support contains a first half and a second half, the second half having a smaller diameter than the first half wherein the second half can be housed in the first half when not in use and can be telescoped back out when in use.

The above embodiment can be further modified by defining that an eyelet is placed at one or both ends of each of the first vertical support, the second vertical support, the third vertical support and the fourth vertical support.

The above embodiment can be further modified by defining that an x-load is created between any two of the vertical supports comprising: a first wire extending from an eyelet on one end of one of the vertical supports to another eyelet on an adjacent vertical support on the opposite end of the adjacent vertical support wherein a substantially 45 degree angle is formed between the adjacent vertical supports; a second wire extending from an eyelet one end of one of the vertical supports to another eyelet on an adjacent vertical support on the opposite end of the adjacent vertical support wherein a substantially 45 degree angle is formed between the adjacent vertical supports; wherein an x-shape is formed between the two adjacent vertical supports by the first wire and the second wire; and wherein the wires are tightened between the adjacent vertical supports through the use of turnbuckles located on each of the wires.

The above embodiment can be further modified by defining that the base members are secured to a pair of supporting members, the supporting members being bolted to the bed of the truck.

DETAILED DESCRIPTION OF A PREFERRED EMBODIMENT

Figure 1:
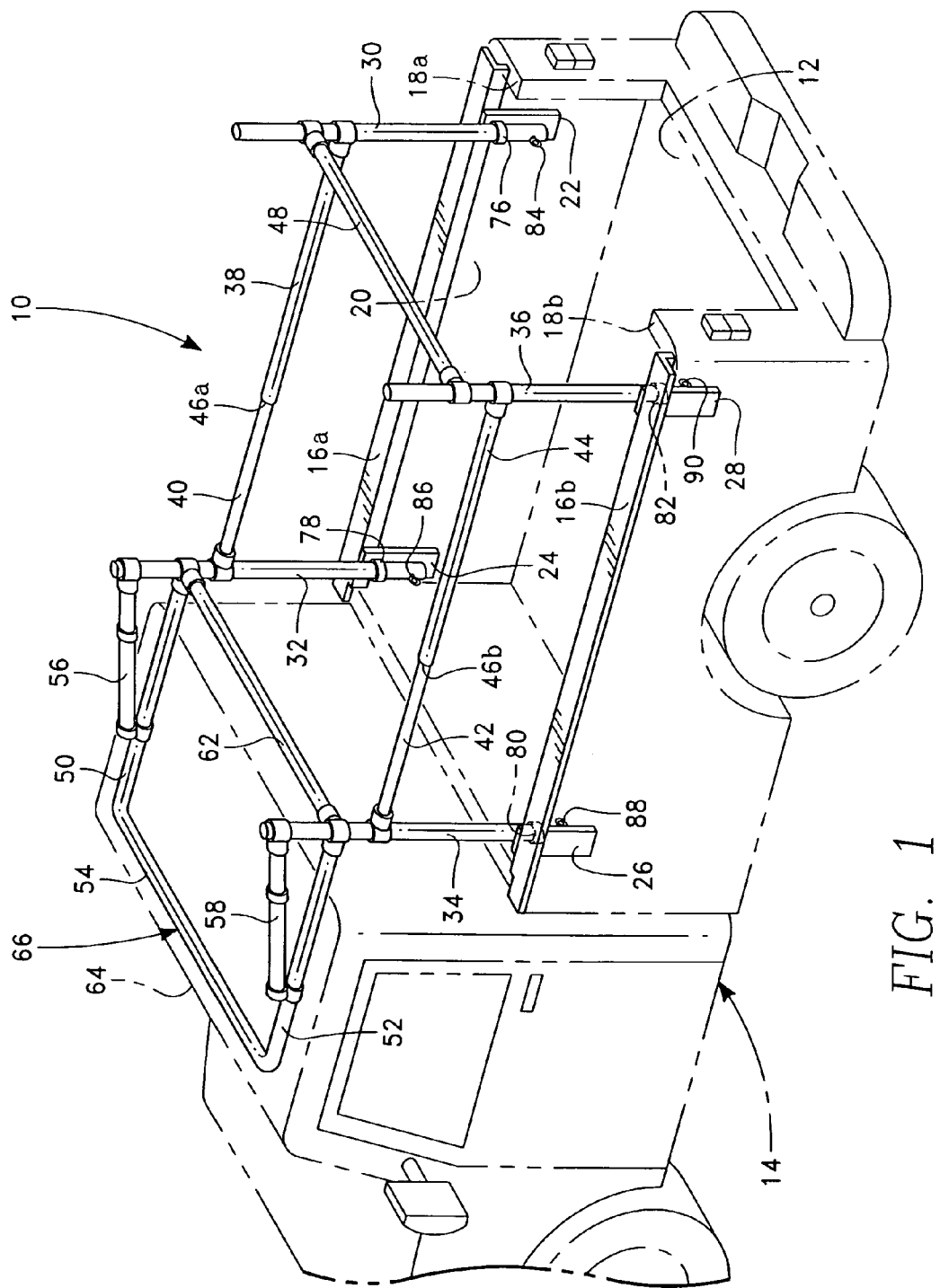
FIG. 1 is a perspective view of the device in use on a pickup truck.

The following list of characters and corresponding numbers is provided for ease of navigation through the drawings:
10 rack
12 bed
14 truck
16a,b supports
18a,b top rims of bed
20 interior peripheral wall of bed
22 first vertical support
24 second vertical support
26 third vertical support
28 fourth vertical support
30 first vertical post
32 second vertical post
34 third vertical post
36 fourth vertical post
38 first horizontal support
40 second horizontal support
42 third horizontal support
44 fourth horizontal support
46a connection between 38/40
46b connection between 42/44
48 fifth horizontal support (rear)
50 first horizontal support over cab
52 second horizontal support over cab
54 third horizontal support over cab
56 first angled support over cab
58 second angled support over cab
60 x-load
62 sixth horizontal support (cab)
64 cab
66 cab extension
68 first hook
70 second hook
72 first turnbuckle
74 second turnbuckle
76 first clamping means
78 second clamping means
80 third clamping means
82 fourth clamping means
84 first eyelet
86 second eyelet
88 third eyelet
90 fourth eyelet
92 first wire
94 second wire
96 first tie down strap
98 second tie down strap
100 third tie down strap
102 fourth tie down strap
104 fifth tie down strap
106 first receiving hole between 38/40
108 second receiving hole between 42/44
110 first receive hole for first wire
112 second receive hole for second wire
114 connector pin
116 sleeve
118 male connector
120 female connector Turning to the drawings, the preferred embodiment is illustrated and described by reference characters that denote similar elements throughout the several views of the instant invention.

The preferred embodiment refers to a collapsible truck rack and a method of use thereof. FIG. 1 shows the rack 10 in the in-use position in the bed 12 of a pickup truck 14. In the configuration shown in FIG. 1 the rack 10 is bolted to a pair of supports 16a, 16b that are then bolted to the two top rims 18a, 18b of the bed 12 of the pickup truck 14. However, this configuration is optional as the rack 10 can also be bolted directly to the top rims 18a, 18b of the bed 12 of the pickup truck 14 just as easily.

The rack 10 is actually bolted either to the supports 16a, 16b or the top rims 18a, 18b of the bed 12 via braces 22, 24, 26, 28 that extend in a perpendicular direction from the support portions 16a, 16b or top rims 18a, 18b of the bed 12 of the pickup truck 14. In the absence of the supports 16a, 16b and braces 22, 24, 26, 28 of the rack 10 would still include the braces 22, 24, 26, 28 but the braces 22, 24, 26, 28 would be bolted directly to the interior peripheral wall 20 of the interior of the bed 12 of the pickup truck 14.

In use, the rack 10 includes a first vertical support 30, a second vertical support 32, a third vertical support 34 and a fourth vertical support 36. Between the first vertical support 30 and the second vertical support 32 is a first connecting horizontal support 38 that includes a second connecting horizontal support 40 that has a smaller diameter than the first connecting horizontal support 38. When not in use, the second connecting horizontal support 40 is housed in a collapsed position inside of the first connecting horizontal support 40, which is then telescoped open when in use. Likewise, between the third vertical support 34 and the fourth vertical support 36 is an analogous third horizontal support 42 and a fourth horizontal support 44 that telescopes in the same manner as the corresponding support between the first vertical support 30 and the second vertical support 32.

Figure 9:
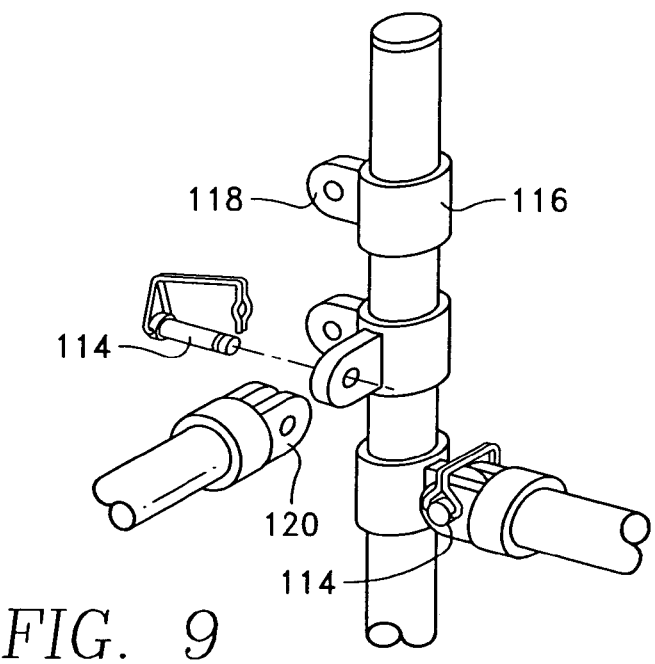
FIG. 9 is a detailed view of a representative connecting system found throughout the apparatus.

After telescoping and when in use, the first horizontal support 38 and the second horizontal support 40 are held in place through a connecting system that is shown in close up in FIG. 9. The clipping system includes a pin 46a (114 in FIG. 9) that is easily secured and removed through the placement of the pin 46a, 114 through holes that connect a male member 118 and a female member 120. The male member 118 and female member 120 are connected to any one part through a sleeve 116. Once the female part 120 is mated with the male part 118, the pin 46a, 114 is placed therethrough to hold the two members that are being connected together. The system of connectors is found throughout the invention. For example, the same system is found for the third horizontal support 42 and the fourth horizontal support 44.

A fifth horizontal support 48 sits between the first vertical support 30 and the fourth vertical support 36. The connector system shown in detail in FIG. 9 is used to secure these supports together. Likewise, a sixth horizontal support 62 sits between the second vertical support 32 and the third vertical support 34.

Furthermore, the rack 10 extends over the cab 64 of the pickup truck 14. The rack extension 66 is connected to the second vertical support 32 and the third vertical support 34 and is held in place by a first angled support 56 and a second angled support 58. The extension 66 includes a first side 50 and a second side 52 wherein the first side 50 and the second side 52 are connected by a third side 54 that sits approximately 90 degrees from the first side 50 and the second side 52. The supports 56, 58 extend from the second vertical support 32 and the third vertical support 34 at an angle of approximately 45 degrees to attach to the first side 50 and the second side 52 of the extension 66. When in the collapsed position, these angled supports 56, 58 bend at a joint that allows for a more compact device.

To prevent a shifting of the rack 10 any load thereon, an x-load 60 is included that is placed between the second vertical support 32 and the third vertical support 34 right behind the cab 64 of the pickup truck 14. This can be seen in detail in FIG. 7. The x-load 60 is comprised of a first wire 92 and a second wire 94. The first wire 92 is first connected to an eyelet 88 found at the base of third vertical support 34 and extends across the cab area 64 at an angle and is secured to the second vertical support 32 and tightened with a first turnbuckle 72. The second wire 94 is connected to another eyelet 86 found at the base of the second vertical support 32 and extends at an angle and secured to the third vertical support 34 and tightened with a second turnbuckle 74.

Figure 8:
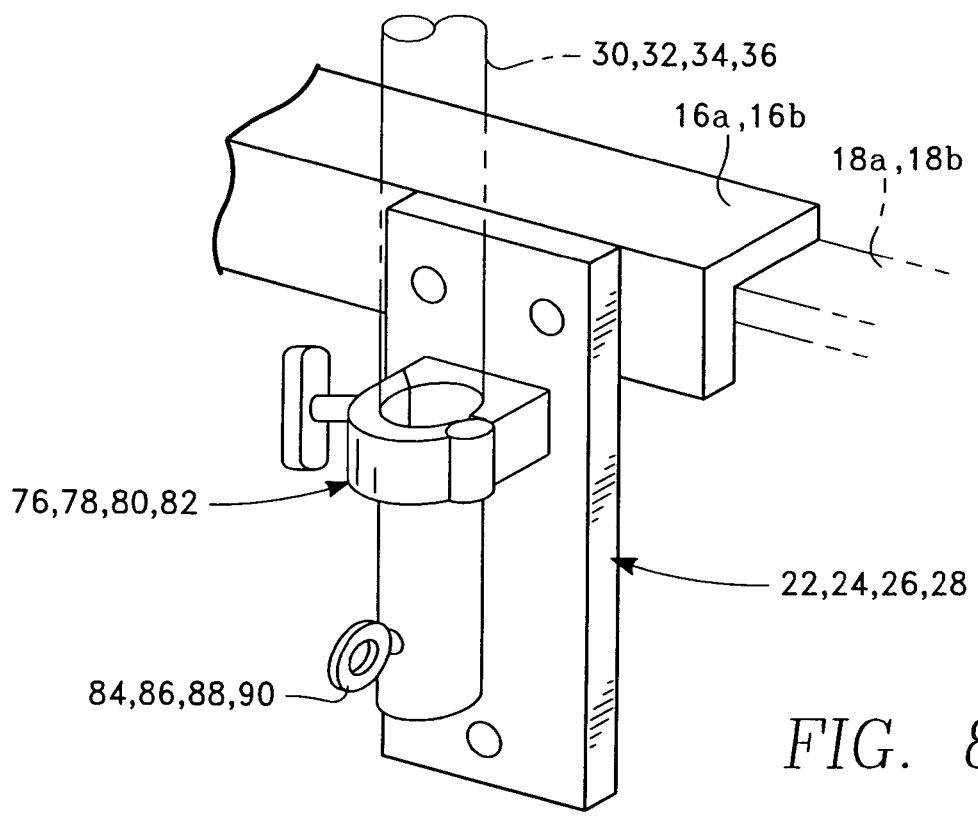
FIG. 8 is a close up view of the clamp and eye bolt of the instant invention that connects the parts of the apparatus during assembly and disassembly.

Eyelets 84, 90 are also found at the base of the first vertical support 30 and the fourth vertical support 36, respectively that would allow a similar configuration at the rear of the rack 10. In the in-use position, each vertical support 30, 32, 34, 36 is secured to the supports 22, 24, 26, 28 through the use of clamping means 76, 78, 80, 82. As described herein the clamping means are wingnuts, but it is to be understood that the invention is not limited to wingnuts as the clamping means. A close up view of the supports 22, 24, 26, 28 can be seen in FIG. 8. Each support 22, 24, 26, 28 includes the clamping means (wingnuts) 76, 78, 80, 82 for placement therein of the vertical supports 30, 32, 34, 36. At the base of each vertical support 30, 32, 34, 36 is the eyelet 84, 86, 88, 90 described above.

Figure 2:
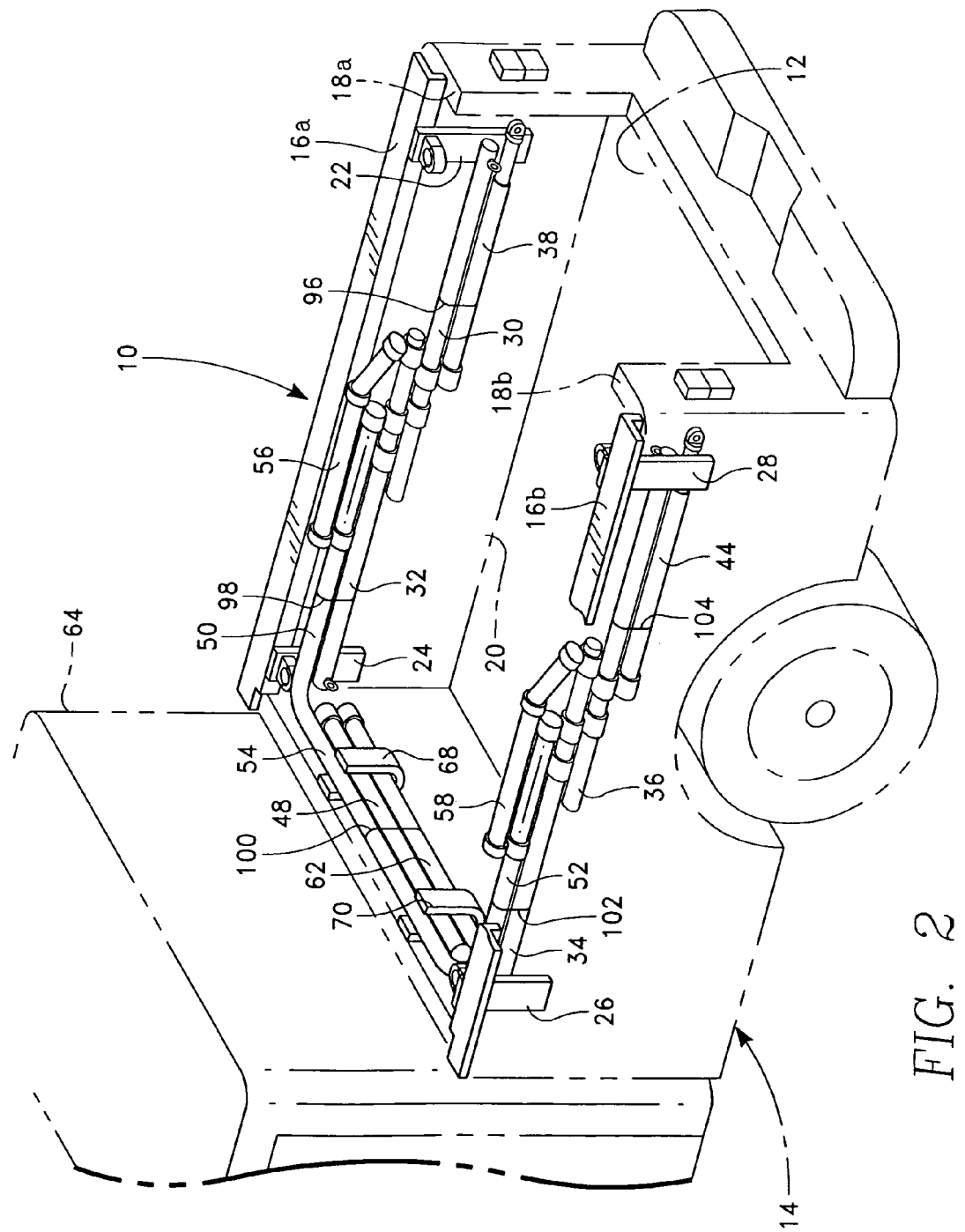
FIG. 2 is a perspective view of the device in the collapsed position stored in the bed of a pickup truck.

The method of assembly (and disassembly when performed in reverse) is demonstrated in FIGS. 2-6. FIG. 2 shows a perspective view of the entire system, where as FIGS. 3-6 demonstrates the assembly (and disassembly when performed in reverse) through a view of just one side. It is to be understood that the invention is symmetrical and what is done on side, is also performed on the opposite side.

In FIG. 2 the entire rack can be seen in the collapsed and stored position. The first vertical support 30 is in a horizontal position and positioned above the corresponding horizontal support 38 (which houses the other half of the horizontal support 40 therein in this configuration). These two portions are held in place with a securing means, such as a tie or bungee cord 96. On the opposite side of the interior peripheral wall 20 of the bed is fourth vertical support 36 above the corresponding horizontal support 44 (with second half 42 housed therein in this configuration). Again, these two members are held together with a securing means 104.

Placed above the first vertical support 30 and the fourth vertical support 36 is the second vertical support 32 that has placed above it in the bent position, the angled support 56 for the cab extension 66, which folds over one horizontal support 50 of the cab extension 66. The second vertical support 32 is secured to the cab extension 66 with another securing tie 98. Extending around the bed 12 of the truck 14 and along the interior peripheral wall 20 is the horizontal portion 54 of the cab extension 66 that sits at a 90 degree angle from the previously noted horizontal extension 50.

This horizontal portion 54 sits atop the fifth horizontal support 62, which sits atop the sixth horizontal support 62. All three members are held together with a securing tie 100. Additionally, a pair of hooks 68, 72 surround all three of these members and keeps them secured during transport.

Extending along the opposite side of the inner peripheral wall 20 of the pickup bed 12 is a configuration that mirrors that on the first side. Angled support 58 sits atop a horizontal portion 52 of the cab extension 66, which sits atop third vertical support 34, all of which are held in place with a securing tie 102. Finally, fourth vertical support 36 sits atop the corresponding horizontal support 44 (with the other half 42 housed therein in this configuration) and secured together with a tie 104.

Figure 3:
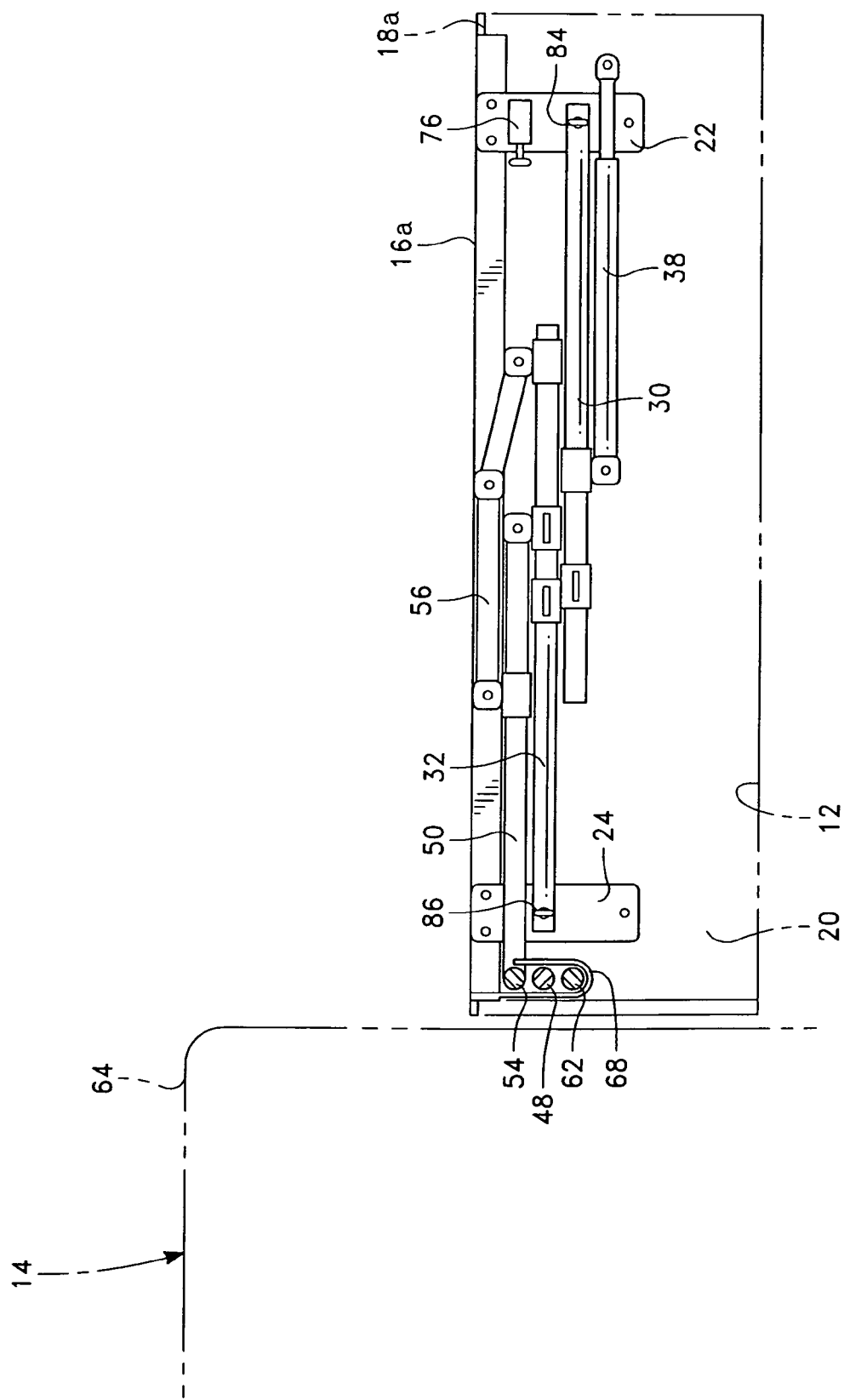
FIG. 3 is a side view of the device in the collapsed position stored in the bed of a pickup truck.
Figure 4:
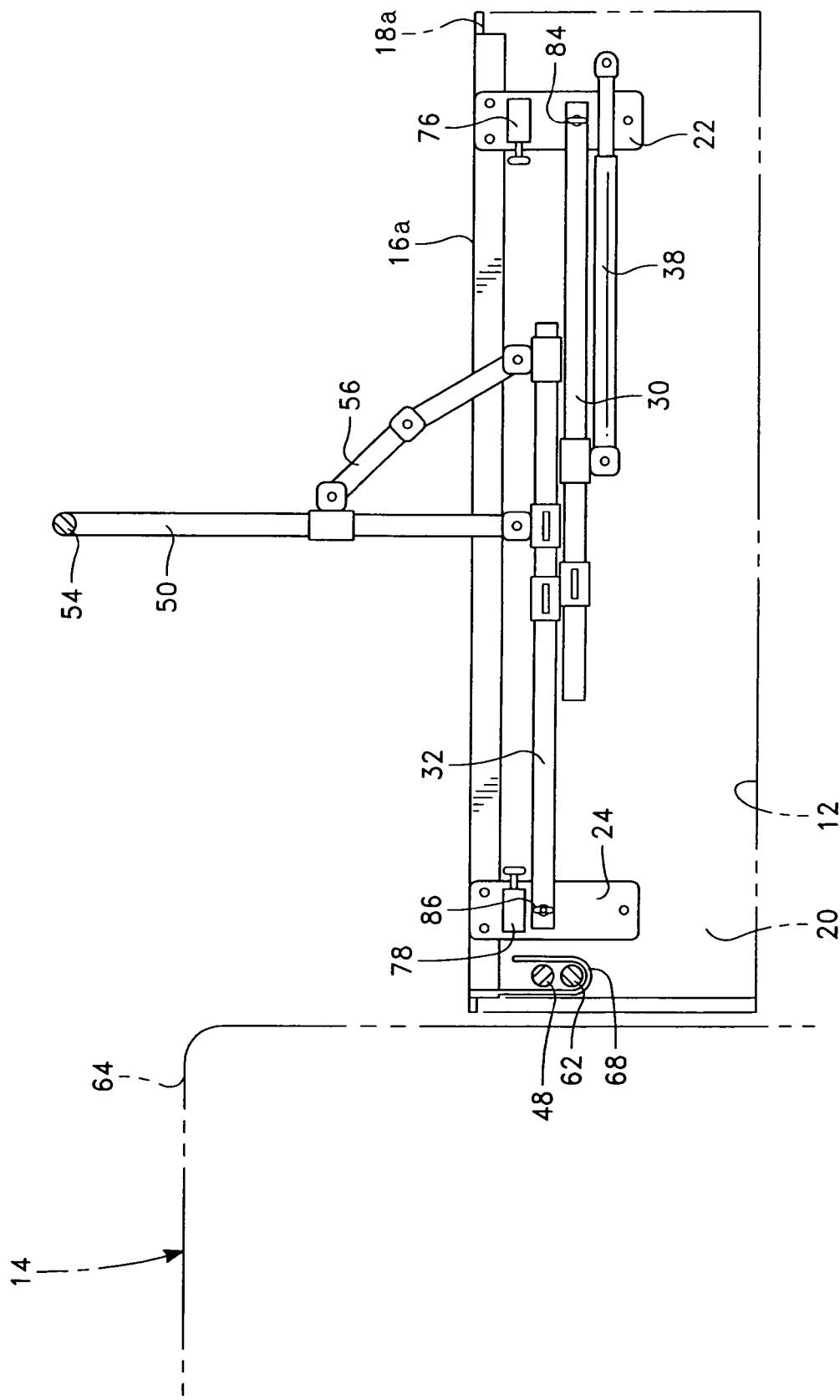
FIG. 4 is a side view of the device in the first position after being moved from the collapsed position into to its in use position.
Figure 5:
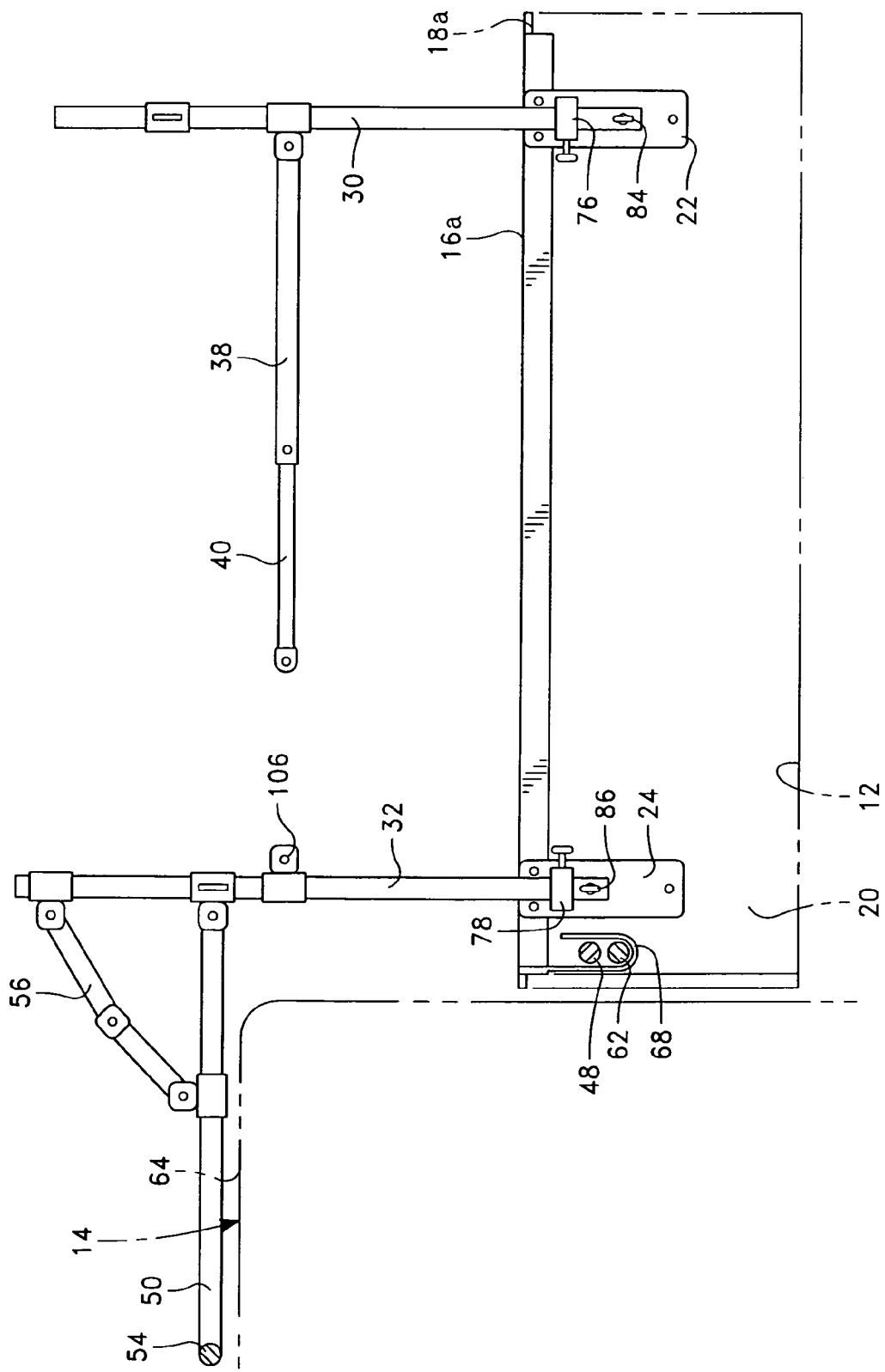
FIG. 5 is a side view of the device in the second position after being moved from the first position after being moved from the collapsed position into its in use position.

Moving to FIG. 3, the first step in the method of assembly is illustrated. The rack 10 is in the collapsed position and housed in the inner peripheral wall 20 of the bed 12 of the pickup truck 14. The securing tie 96 that holds the first vertical support 30 and the corresponding horizontal support 38 is removed. Likewise, the tie 98 securing the second vertical support 32 to the cab extension 66 is removed. In FIG. 4, it can be seen that the next step is that the cab extension horizontal bar 50 is extended upward and the angled support 56 popped into position. As seen in FIG. 5, once these steps are repeated on the opposite side, the second vertical support 32 and the third vertical support 34 are moved into a position proximate the cab 64 wherein the cab extension 66 sits atop the cab 64.

Figure 6:
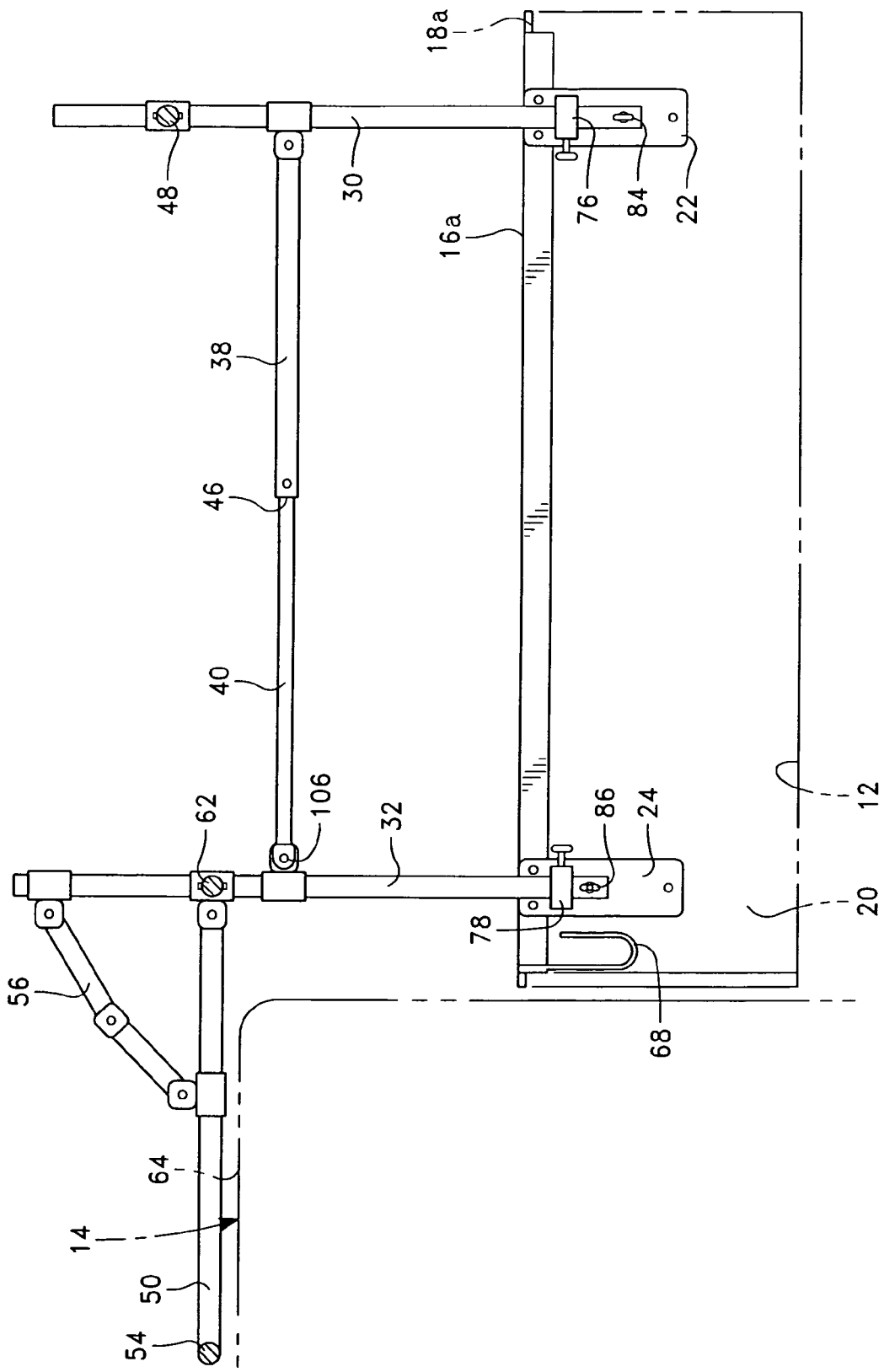
FIG. 6 is a side view of the device in the third position after being moved from the second position after being moved from the first position after being moved from the collapsed position into its in use position.

Once the cab extension 66 is put in place, the first vertical support 30 is moved from the collapsed horizontal position to its vertical position. Horizontal support 38 is bent into position and the other half 40 is removed from inside of the first half 38. As can be seen in FIG. 6, once the second half 40 is extended toward the third vertical support 32, the horizontal support 40 is secured to the third vertical support 106 through mating the male and female parts (see FIG. 9) and secured with a pin 114. The connection between the first half 38 and the second half 40 is likewise secured with a pin 46 at the junction.

Figure 7:
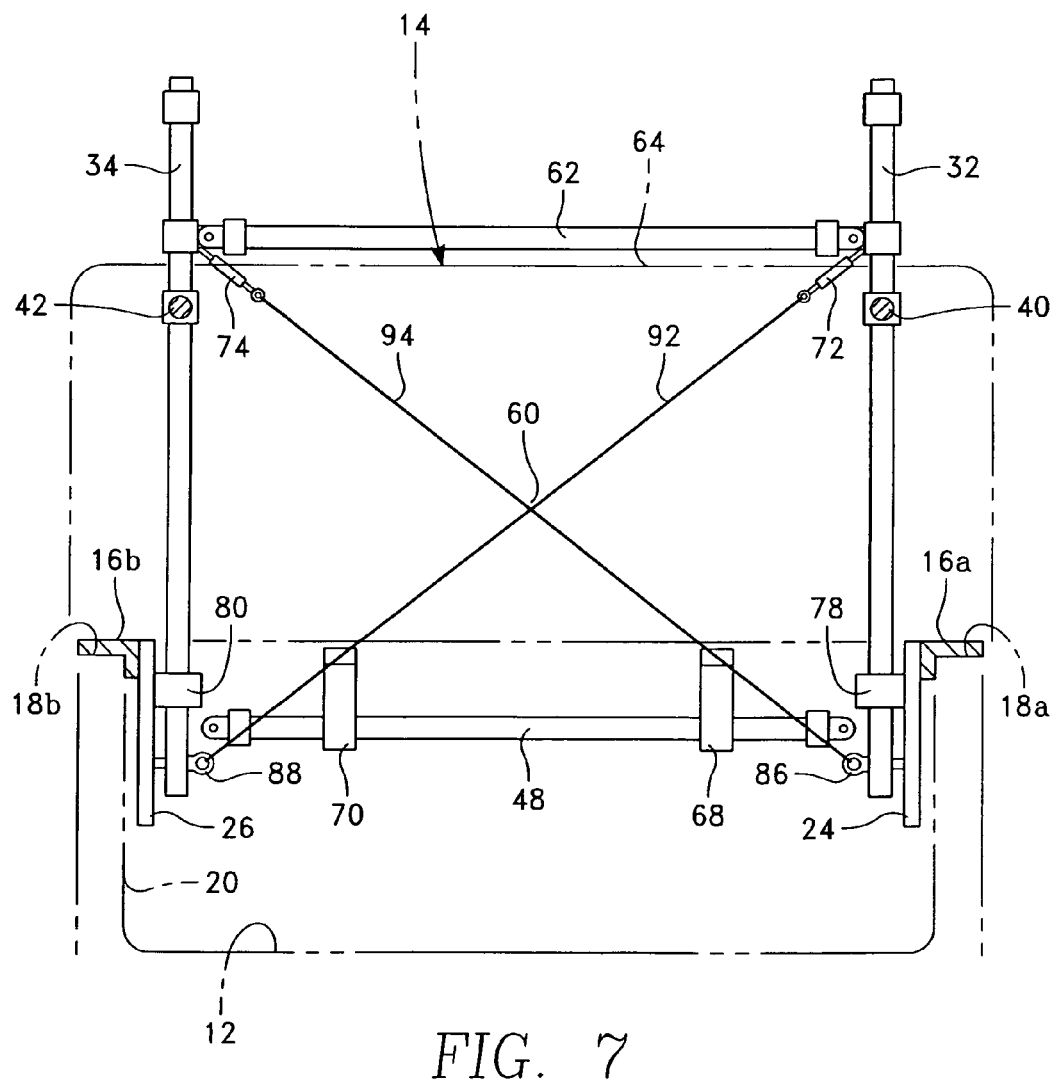
FIG. 7 is a view of the rack in its assembled configuration viewing it from the rear of the bed of the pickup truck and with the cables attached in the x-load position.

The entire process is repeated on the opposite side connecting the third vertical support 34 with the fourth vertical support 36. Once this process is completed, the optional x-load 60 can be utilized as seen in FIG. 7. Not shown, a canvas cover can obscure the entire device once it is in the collapsed position.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A collapsible truck rack comprising:
   a first vertical support;
   a second vertical support;
   a third vertical support;
   a fourth vertical support;
   wherein said first vertical support, said second vertical support, said third vertical support and said fourth vertical support move between a first vertical position when in use and a second position that is horizontal for placement in the interior peripheral wall of the bed of a truck when not in use;
   a first horizontal support connecting said first vertical support and said second vertical support;
   a second horizontal support connecting said second vertical support and said third vertical support;
   a third horizontal support connecting said third vertical support and said fourth horizontal support;
   a fourth horizontal support connecting said fourth vertical support and said first vertical support;
   a substantially rectangular shaped cab extension that extends over the cab of said truck wherein said substantially rectangular shaped cab extension further comprises:
      a first member connected at one end to said second vertical support;
      a second member connected at one end to the other end of said first member;
      a third member connected at one end to the other end of said second member and at the other end to said third vertical support;
      wherein said second horizontal support is connected between said second vertical support and said third vertical support and acting as the fourth side of said substantially rectangular shaped cab extension;
      a first angled support with a bendable joint that connects at an angle from said second vertical support to said first member; and
      a second angled support with a bendable joint that connects at an angle from said third vertical support to said third member;
   wherein said first vertical support, said second vertical support, said third vertical support and said fourth vertical support are secured to said bed of said truck through corresponding base members that are permanently affixed to the interior peripheral wall of said bed of said truck and wherein an eyelet is placed at one or both ends of each of said first vertical support, said second vertical support, said third vertical support and said fourth vertical support and wherein an x-load is created between any two of said vertical supports comprising:
      a first wire extending from an eyelet on one end of one of said vertical supports to another eyelet on an adjacent vertical support on the opposite end of said adjacent vertical support wherein a substantially 45 degree angle is formed between said adjacent vertical supports;
      a second wire extending from an eyelet one end of one of said vertical support to another eyelet on an adjacent vertical supports on the opposite end of said adjacent vertical support wherein a substantially 45 degree angle is formed between said adjacent vertical supports;
   wherein an x-shape is formed between said two adjacent vertical supports by said first wire and said second wire; and
   wherein said wires are tightened between said adjacent vertical supports through the use of turnbuckles located on each of said wires.

* * * * *